(12) United States Patent
Hart

(10) Patent No.: US 9,014,736 B2
(45) Date of Patent: Apr. 21, 2015

(54) PORTABLE NETWORK DEVICE FOR THE DISCOVERY OF NEARBY DEVICES AND SERVICES

(75) Inventor: John H Hart, Saratoga, CA (US)

(73) Assignee: Plantronics, Inc., Santa Cruz, CA (US)

( * ) Notice: Subject to any disclaimer, the term of this patent is extended or adjusted under 35 U.S.C. 154(b) by 741 days.

(21) Appl. No.: 12/277,226

(22) Filed: Nov. 24, 2008

(65) Prior Publication Data

US 2010/0130240 A1 May 27, 2010

(51) Int. Cl.
*H04W 72/00* (2009.01)
*H04W 8/00* (2009.01)

(52) U.S. Cl.
CPC ..................... *H04W 8/005* (2013.01)

(58) Field of Classification Search
CPC ... H04W 8/005; H04B 7/0413; H04B 7/0456; H04L 67/16; H04L 67/18; H04L 67/306
USPC .................................................. 455/517–519
See application file for complete search history.

(56) References Cited

U.S. PATENT DOCUMENTS

| 6,795,688 | B1 | 9/2004 | Plasson et al. | |
|---|---|---|---|---|
| 7,231,209 | B2 * | 6/2007 | Blom et al. | 455/420 |
| 7,522,929 | B2 * | 4/2009 | Hashizume | 455/517 |
| 7,580,393 | B2 * | 8/2009 | Wang et al. | 370/332 |
| 7,720,021 | B1 * | 5/2010 | Zhou et al. | 370/315 |
| 7,933,293 | B2 * | 4/2011 | Wentink | 370/473 |
| 7,948,951 | B2 * | 5/2011 | Wentink | 370/338 |
| 8,102,901 | B2 * | 1/2012 | Aissi et al. | 375/219 |
| 8,144,596 | B2 * | 3/2012 | Veillette | 370/238 |
| 2002/0163895 | A1 | 11/2002 | Haller et al. | |
| 2004/0057440 | A1 | 3/2004 | Thubert et al. | |
| 2004/0093426 | A1 | 5/2004 | Sahasrabudhe et al. | |
| 2004/0162871 | A1 | 8/2004 | Pabla et al. | |
| 2004/0236850 | A1 | 11/2004 | Krumm et al. | |
| 2005/0058144 | A1 | 3/2005 | Ayyagari et al. | |
| 2006/0023676 | A1 | 2/2006 | Whitmore et al. | |

(Continued)

FOREIGN PATENT DOCUMENTS

| EP | 1672899 A1 | 6/2006 |
|---|---|---|
| EP | 1865687 | 12/2007 |
| WO | 2007085592 | 8/2007 |
| WO | 2008024099 | 2/2008 |

OTHER PUBLICATIONS

European Patent Office. International Search Report: PCT/US2009/060133. Mail Date: Mar. 1, 2010. Netherlands, Rijswijk.

(Continued)

*Primary Examiner* — Bobbak Safaipour

(57) ABSTRACT

A method of determining communication resource availability within range of a user-centric mobile network is disclosed. In one embodiment the method comprises discovering communication resources within range of the user-centric mobile network, the communication resources including unique resource identifiers, and transmitting the unique resource identifiers and a user identifier to a server that is accessible from outside the user-centric mobile network. The communication resources may have associated therewith an available service and a current status and the method may further comprise transmitting available service information and current status information to the server. Also disclosed is a service discovery device for use in implementing the method.

25 Claims, 4 Drawing Sheets

(56) References Cited

U.S. PATENT DOCUMENTS

| | | | |
|---|---|---|---|
| 2006/0133414 A1 | 6/2006 | Luoma et al. | |
| 2006/0268896 A1 | 11/2006 | Kotola et al. | |
| 2007/0195760 A1 | 8/2007 | Rahman et al. | |
| 2007/0276937 A1 | 11/2007 | Chavda et al. | |
| 2009/0017851 A1* | 1/2009 | Li et al. | 455/502 |
| 2009/0323647 A1* | 12/2009 | Park et al. | 370/338 |
| 2009/0325601 A1* | 12/2009 | Park et al. | 455/456.2 |
| 2010/0260348 A1* | 10/2010 | Bhow et al. | 381/81 |

OTHER PUBLICATIONS

European Patent Office. Written Opinion: PCT/US2009/060133. Mail Date: Mar. 1, 2010. Netherlands, Rijswijk.

Campos, R., Ricardo, M., "Dynamic and Automatic Connection of Personal Area Networks to the Global Internet", Proceedings of the 2006 International Conference on Wireless Communications and Mobile Computing, Jul. 3-6, 2006, pp. 581-586, ACM, Vancouver, Canada.

Campos, R., Ricardo, M., "Autoconfiguration and Self-Management of Personal Area Network: a New Framework", 15th Meeting of the Wireless World Research Forum, Dec. 8-9, 2005, Paris, France.

Matsushita et al., "Wearable Key: Device for Personalizing Nearby Environment", Proceedings of the 4th IEEE International Symposium on Wearable Computers, 2000, pp. 119, IEEE Computer Society, Washington DC, USA.

Presentation titled "IXI Mobile Overview: Connect With Style, Corporate Overview, Mar. 2003".

Press-release document titled, "Industry Veterans Create Innovative Personal Area Network for Wireless Devices", Demo Feb. 11, 2002, PRNewswire, Phoenix, USA.

* cited by examiner

PORTABLE NETWORK DEVICE FOR THE DISCOVERY OF NEARBY DEVICES AND SERVICES

BACKGROUND OF THE INVENTION

With the proliferation of devices that are capable of communicating with other devices and the increased number of communication locations and options, the opportunities for interacting with a particular individual have increased considerably. However, identifying the best method of communication with the individual, as well as determining the availability of that person for communication, has become correspondingly more difficult.

In particular, communications over the Internet are routed between personal computers, servers, gateways etc. and not between users. Users and their peripheral devices are positioned "behind" their devices, and thus their "presence" is invisible to the Internet and to other users that might want to communicate with them.

Further, the large number of options for communicating with a user (e.g. instant messaging, voice over IP, text messaging, email, POTS, cellular communication, video conferencing etc.) and the large number of devices that can potentially support communication (smart phones, laptops, networked media devices, headsets, video conferencing facilities etc.) both complicate the question of how and where to communicate with a particular user.

It would be desirable to provide a method of identifying "where" in this large and diverse communications infrastructure users are and how best to communicate with them.

SUMMARY OF THE INVENTION

According to one aspect of the invention, provided is a method of determining communication resource availability within range of a user-centric mobile network, the user-centric mobile network being associated with a particular user having a user identifier, the method comprising: discovering communication resources within range of the user-centric mobile network, the communication resources including unique resource identifiers; associating the unique resource identifiers with the user identifier; and transmitting the unique resource identifiers and a user identifier to an entity that is external to the user-centric mobile network and that intends to communicate with the user.

The communication resources may have associated therewith an available service and a current status, and the method may further comprise transmitting available service information and current status information to the entity.

The resource identifiers, available service information and current status information may be aggregated by a service discovery device within the user-centric mobile network. An external server may poll the communications resources to determine available service information and current status information.

The service discovery device may also serve as a gateway for communications between communication resources that become members of the user-centric mobile network and devices that are external to the user-centric mobile network.

A discovered communication resource may transmit its available service and current status to a server that is accessible from outside the user-centric mobile network. In such a case, a service discovery device within the user-centric mobile network may transmit the user identifier and information identifying the server to the discovered communication resource.

According to another aspect, at least one of the communication resources that is discovered may not be available to become a member of the user-centric mobile network but is available to receive communications for the user. In such a case, the communication resource that is not available to become a member of the user-centric mobile network may transmit its unique resource identifier, the user identifier, its available service information and current status information to a server that is accessible from outside the user-centric mobile network. The server may also poll the communication resource that is not available to become a member of the user-centric mobile network to determine available service information and current status information.

According to another aspect, the server that is accessible from outside the user-centric mobile network may include preference information relating to how a user prefers to be contacted via the communications resources, which is updated based on available service information and current status information. Other preferences that are not based on available service information and current information resource status information may also be specified. For example, a user may set a "do not disturb" preference, which may not apply to all of the user's contacts.

The server may also be associated with a social networking service such as Facebook or Myspace, and the preference information may be provided together with the other services provided by such social networking sites. The access to information associated with the user identifier may be limited to individuals who have been authorized by the user. The server that transmits the available service information and current status information to the entity may also be a member of the user-centric mobile network, including being provided on a service discovery device within the network.

According to another aspect of the invention, provided is a portable communications service discovery device for determining communication resource availability within range of a user-centric mobile network, comprising a resource discovery module for discovering communication resources within range of the user-centric mobile network, the communication resources having unique resource identifiers; and, a reporting module for providing the unique resource identifiers and a user identifier to a server that is accessible from outside the user-centric mobile network.

The communication resources may have associated therewith an available service and a current status and the reporting module may provide the available service information and current status information to the server.

The service discovery device may aggregate resource identifiers, available service information and current status information and may further comprise a gateway module to serve as a gateway for communications between communication resources that become members of the user-centric mobile network and devices that are external to the user-centric mobile network.

In one embodiment, a discovered communication resource may transmit its available service and current status to the server that is external to the user-centric mobile network. In such a case, the provision of a discovered communication resource's available service information and current status may be initiated by the reporting module transmitting the user identifier and information identifying the server to the discovered communication resource. Alternatively, the provision of a discovered communication resource's available service information and current status may be initiated by the reporting module transmitting the user identifier and the unique identifier of the discovered communication resource to the server, which in turn polls the discovered communication resource for its available service information and current status.

In one embodiment, the server that is accessible from outside the user-centric mobile network is located in the service discovery device.

Further aspects of the invention will be apparent from the detailed description set forth below.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE DRAWINGS

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The invention relates to a communication concept known as "presence." When used with reference to a user (typically a human being) of a communication system, "presence" refers to a description of the state of the user that defines what channels are available for use in communicating with the user and how the available channels should be used in communicating with the user. Of course, as the user's personal situation changes (e.g. from working on a laptop in a meeting at work to driving home on a cellular network call to being at home watching TV with family), the available communication channels will change, as well as the user's preferences for how these communication channels should be used. As the user's "presence" changes, it would be useful to have a means of generating presence-related information (for example, which communication channels or resources are in the vicinity of the user) and making this information available to third parties that may wish to communicate with the user.

Figure 1:
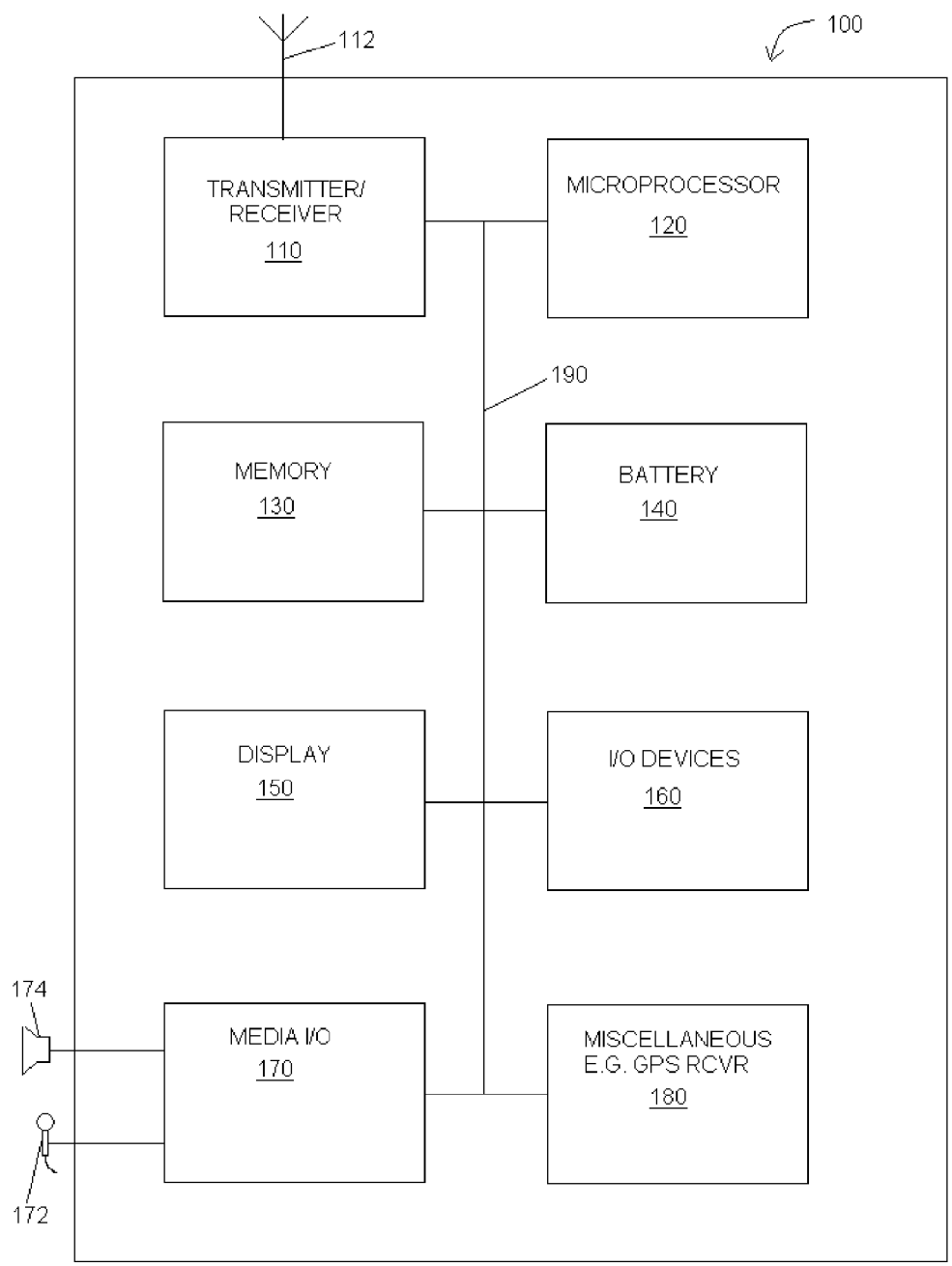
FIG. 1 illustrates an exemplary structure of a portable service discover device according to one aspect of the invention.

To this end, a generalized portable service discovery device 100 in accordance with one embodiment of the invention is shown schematically in FIG. 1. The service discovery device 100 may in practice be embodied in any portable form factor, for example as a stand-alone device or in a cellular telephone, laptop computer, headset, PDA, or any other portable device that may accompany a user.

As will be discussed in more detail below with reference to FIG. 3, the service discovery device 100 is typically a member of a user-centric mobile network. As the name implies, the user-centric mobile network comprises a network of devices/communication resources in the general vicinity of the user. The communication resources that form part of the user-centric mobile network will either travel with the user as the user moves, or will enter and leave the user-centric mobile network as the user enters or leaves the vicinity of particular communication resources. The devices that form part of a user-centric mobile network may be portable or may be fixed infrastructure devices, and may or may not be owned by the user.

The service discovery device 100 in one aspect of the invention, serves to discover communication resources that are available to become members of the user-centric mobile network, and initiate membership of the user-centric mobile network by those communication resources.

The user-centric mobile network may for example be a network of the type known as a personal area network ("PAN") or a body-area network ("BAN"). In this regard, a BAN is typically considered to comprise devices that are on or in the body of the user or within arm's length, while a PAN includes devices in a BAN as well as devices within the general vicinity of the user. For the purposes of the service discovery device 100, the distinction between a BAN and a PAN is an artificial distinction.

The service discovery device 100 in another aspect of the invention serves to discover communication resources that are in the vicinity of the user and are available for the user to interact with or for another entity to use in communicating with the user, but which are not available to become part of the user-centric mobile network.

As shown in the figure, portable service discovery device 100 in one embodiment comprises one or more transmitter/receivers 110, antenna(s) 112, a microprocessor 120, memory 130, a battery 140, a display 150, user input/output devices 160, media input/outputs 170 and additional miscellaneous hardware 180. The portable service discovery device 100 also includes an internal data bus 190 to permit communication between the various components.

The service discovery device 100 may, in a comprehensive embodiment, include all of the elements illustrated in FIG. 1, but in simpler embodiments will omit one or more of the elements shown in FIG. 1. For example, a simplified version of the service discovery device 100 may omit the display 150, user input/output devices 160, media input/output 170. Of course, the particular components that are or are not included will depend on the particular implementation and on design choices.

The transmitter/receiver 110 enables the service discovery device 100 to communicate wirelessly with a number of external devices. The transmitter/receiver 100 may utilize any number of different short and long range communications protocols to accomplish its function. For example, the service discovery device 100 may support one or more wireless local area network (WLAN) protocols (e.g. such as 802.11) to enable it to establish internet connectivity through a nearby wireless router and also to connect with other devices using the same protocol. The service discovery device may also use one or more cellular network technologies such as WIMAX, GPRS, 3G etc. for establishing internet connectivity.

The transmitter/receiver 110 will also typically support one or more short range protocols, such as Bluetooth™ or NFC (Near Field Communication), which will enhance the ability of the service discovery device 100 to interact with devices in the vicinity, as will be described in more detail below.

The microprocessor 120 provides data processing capabilities to the service discovery device, and may comprise any suitable data processing device, such as a general purpose processor or an application specific integrated circuit or a digital signal processor. Further, one or more components of the service discovery device 100 may be embodied in a single "system on a chip."

The memory 130 provides data storage for device firmware, program instructions and data. The memory 130 may include any combination of volatile and non-volatile memory of any appropriate type. The particular memory requirements will depend largely on the cumulative functions that the device 100 is expected to perform. For example, if the service discovery device 100 is embodied in a laptop, the memory 130 may include ROM, RAM and a hard drive.

The battery 140 serves to power the device and is typically rechargeable. Appropriate battery charging and management facilities of a known type are provided either in the device or in a companion charging device.

The service discovery device 100 may include a display 150 for user interaction, various I/O devices 160 such as a keyboard, touchpad etc., and one or more media I/Os 170 such as audio and video input/output ports, a microphone 172 and a loudspeaker 174.

Still further, the service discovery device may include additional miscellaneous hardware 180, such as a GPS receiver, a digital camera, wired I/O ports such as USB, etc.

Figure 2:
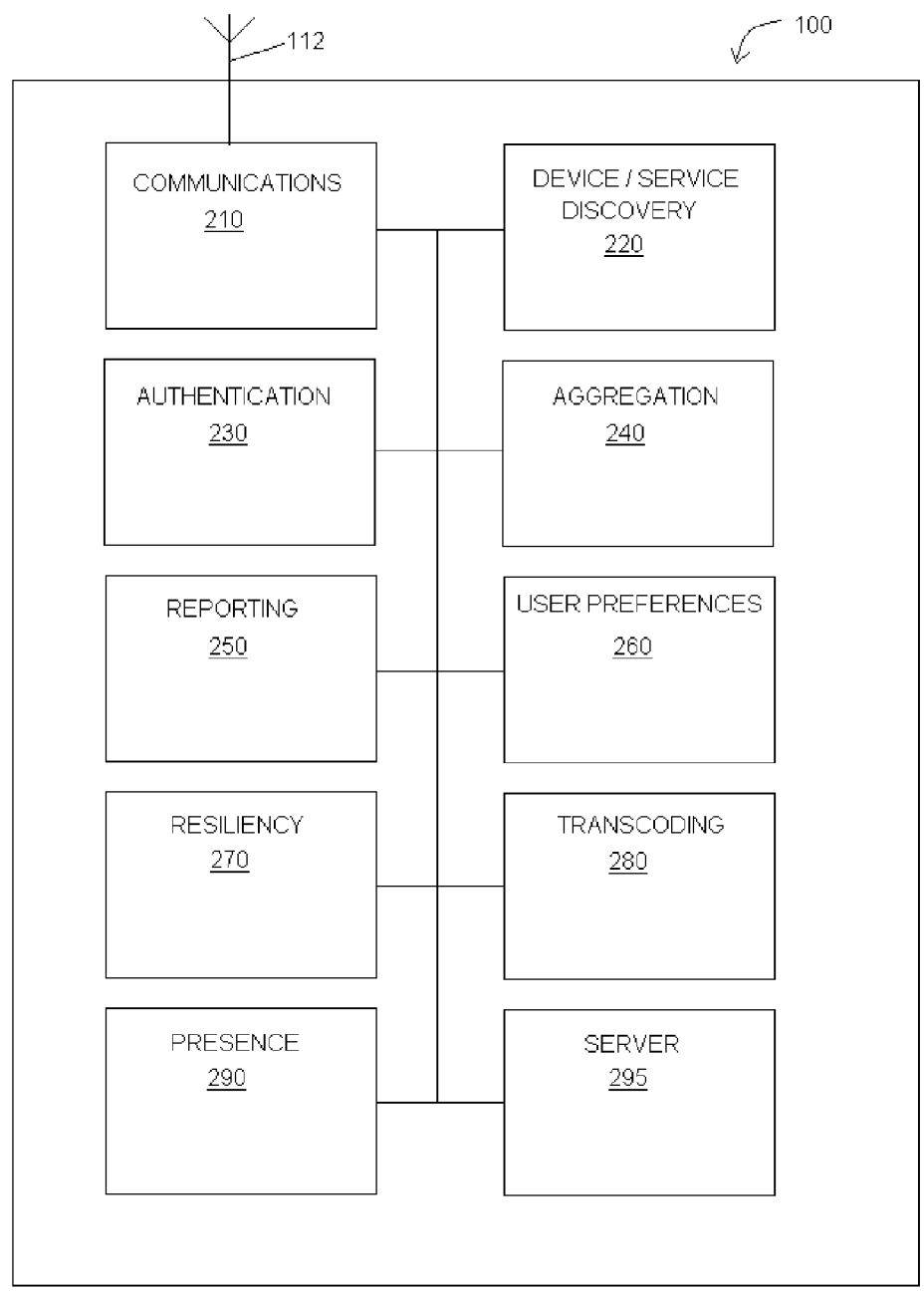
FIG. 2 illustrates functional modules embodied in the exemplary portable service discovery device of FIG. 1.

The functional modules in an embodiment of the service discovery device 100 are illustrated in FIG. 2, and comprise a communications module 210, a device/service discovery module 220, an authentication module 230, an aggregation module 240, a reporting/notification module 250, a user preferences and prioritization module 260, a resiliency/updates module 270, a transcoding module 280, a presence module 290 and a server module 295. As will be apparent below, one or more of these modules may be found in other devices in a system according to the invention, or may be omitted in particular configurations.

As can be expected, the communications module 210 provides the necessary communications functions and protocols to enable the service discovery device to communicate with external devices as discussed above with reference to the transmitter/receiver 110 in the hardware schematic of FIG. 1. The communications module 210 and the transmitter/receiver are accessed as needed by the other modules and hardware to satisfy their communications needs.

The device/service discovery module 220 serves to identify communication resources within the vicinity of a user who is carrying the service discovery device 100, as will be discussed in more detail below with reference to FIG. 3. The discovery module 220 polls for available devices using one or more of the communications protocols supported by the service/discovery device 220. For example, the Session Initiation Protocol (SIP) signaling protocol may be used for identifying a communication resource (for example 350 in FIG. 3) in the vicinity and establishing creating, modifying and terminating a session between the service discovery device 100 and the communication resource 350. Alternatively the Bluetooth™ Service Discovery Protocol (SDP) or the Near Field Communication Interface and Protocol, or any other suitable protocol, may be used.

Once a session has been initiated with the communication resource 350, the authentication module 230 authenticates itself (and hence the user who is carrying it) to communication resource 350 as well as authenticating the communication resource 350 to the service discovery device 100. Authentication ensures that neither the service discovery device 100 nor the communication resource 350 is a malicious device that may be attempting malicious access or attempting to spoof the identity of a user, for example to redirect communication intended for a particular user. Authentication may be accomplished by means of any appropriate authentication technique, for example by the exchange of digital certificates.

Note however that while authentication and mutual authentication is desirable in certain circumstances, it may not be necessary or required in other circumstances. For some applications, authenticating the identity of the respective device with which a service discovery device 100 and/or communication resource 350 is communicating is not needed. This is analogous to web browsing—most browsers only authenticate the site to the user, not the user to the site. There may even be applications where the identity of the person holding the service discovery device 100 is irrelevant, for example a museum-issued service discovery device 100 held by a museum visitor as they roam the building.

To accomplish authentication, the service discovery device 100 may for example be pre-installed during manufacturing with a digital certificate that contains device information (e.g., manufacturer, model, serial number, Media Access Control (MAC) address, etc.) This device-specific certificate (typically generated using public key infrastructure (PKI)) can then be associated with the user during a registration process at a certifying authority (CA). The user or owner may also register or personalize the service discovery device 100 to include an independent user certificate that contains information unique to the user (e.g., name, e-mail address, SIP address, phone number, etc.) During registration, the CA may combine the device-specific information and the user-specific information into a digital certificate that provides identification of both the device and the user. Similarly, a communication resource 350 may have an associated digital certificate by means of which the communication resource 350 may be authenticated to the service discovery device 100.

In one example, when a session has been established between a service discovery device 100 and a communication resource 350, they exchange their digital certificates. Using the information provided in or with the digital certificate, each device can check with a Certifying Authority that the digital certificate is still valid and corresponds to the device that has provided the digital certificate, and each device can verify that the sending device has the private key of the sent certificate.

In addition to handling authentication between the service discovery device 100 and a communication resource 350, the authentication module 230 also serves to authenticate the service discovery device 100 to an external server 340 (see FIGS. 3 & 4) as will be discussed in more detail below.

Further information on the implementation of digital certificates to facilitate authentication can be found in U.S. patent application Ser. No.: 12/191,263, which was filed on Aug. 13, 2008 and is entitled: "Personalized I/O Device as Trusted Data Source," the disclosure of which is incorporated herein by reference as if explicitly set forth.

Once authentication has taken place between the service discovery device 100 and a communication resource 350, the aggregation module 240 triggers the gathering of available service and current status information for the communication resource 350. This may be accomplished by having the communication resource 350 transmit its available services and current status to the service discovery device 100 or to an external server 340 (see FIGS. 3 & 4). In the latter case, the communication resource 350 will also transmit information identifying the service discovery device 100 or its user to the external server 340, so that the availability of the communication resource 350 in the vicinity of the user, its available services and status, can be included in an aggregate record associated with the user. If the communication resource 350 is a standard device with known services, the available service information may simply be an identification of the communication resource 350.

The aggregate record, as the name implies, is typically an aggregation of the available communication resources that are in the vicinity of the user and are available as resources for interacting with the user, their available services, their statuses, and identification information relating to the user of the service discovery device 100.

The aggregation module 240, either in the service discovery device 100 or in an external server 340, maintains and updates the aggregate record in response to communication resources entering or leaving the vicinity of the user (as will be discussed in more detail below) and on the statuses and available services of the communication resources that are in the vicinity of the user. In the event that the aggregation module 440 (see FIG. 4) is located in an external server 340, more than one instance of the aggregation module 440 may be present and each instance of the aggregation module 440 may manage an associated aggregation record for more than one user.

The reporting module 250 initiates the reporting of updates detected by one or more of the other modules. For example, if the modules 220, 230 have discovered and authenticated a new communication resource, the reporting module 250 initiates reporting of this update to the aggregation module 240. The reporting may be an internal function if the aggregation module 240 is in the service discovery device 100, or may be the initiation of an update communication to an external server 340 from the service discovery device 100. The reporting module may also request that a communication resource report its presence and/or current status to an external server 340.

The user preferences module 260 manages a record of the user's communication preferences. As with the aggregation module 240, the user preferences module 260 may be located on the service discovery device 100 or on an external server 340. In the event that the user preferences module 450 (see FIG. 4) is located in an external server 340, more than one instance of the user preferences module 450 may be present, and each instance of the user preferences module 450 may manage an associated user preferences record for more than one user.

The user's communication preferences specify the preferred and/or required way in which a remote entity 345 (for example another user, a machine intelligence, or an information service provider) should interact with a user via the communications resources that are available for this purpose. The factors that may be taken into account in specifying recommended types and devices for communication are almost limitless, but may include the types of communication resources in the vicinity of the user and the services available on those resources, their current status, the location of the user, particular rules set by the user, the local time zone, entries on a user's calendar, etc. The preferences are user-editable using any suitable device that can access the user preferences directly or over one or more networks. If the service discovery device 100 is sufficiently full-featured, it may be used itself to edit the user preferences irrespective of where the user preferences are stored.

That is, the aggregate record maintained by the aggregation module 240 defines what is available for communicating with the user, while the user preferences record maintained by the user preferences module 260 defines the rules as to how a third party should communicate with the user in any particular circumstance. As will be appreciated, this information may be cumbersome and unintuitive to provide to a third party without refinement, or for privacy purposes it may not be desirable to make all of this information available without restriction. Accordingly, the presence module 290 applies the rules in the preferences record to the aggregation record to arrive at a snapshot of the user's current "presence" (i.e. availability and willingness to communicate, and the means by which communication should be effected). The presence module may also alternatively be located on a remote server 340 instead of or in addition to in the service discovery device 100.

For example, if a user is in a conference room that has a speakerphone, a projector and a printer, and the user has a cell phone and a doffed headset (i.e. not on the user's head) and a laptop that is showing current activity, and the user's calendar shows that the user is in an important meeting, the aggregation module 240 might report that the speakerphone, projector, printer and cell phone are all present and ready to communicate with the user, but application of the user preferences to this scenario by the presence module 290 might result in a specification that the recommended method of communicating with the user in this instance is to send an instant message.

Once the person leaves the conference room with the laptop in a closed or off state, and the headset in a doffed but inactive state, the aggregation module 240 will be updated to reflect these status changes and that the speakerphone, projector and printer are no longer available. The presence module 290 will then apply the user preferences to these changed circumstances, and a remote entity 345 wishing to communicate with the user will then be informed, for example, that a cell phone call or cellular SMS message is the preferred method of communicating with the user.

The presence module 290 thus generates a conclusion or result from the records maintained by the aggregation module 240 and the preferences module 260. This conclusion or result can then be provided on request by the server module 295 to an entity 345 wishing to communicate with the user, or it can be "pushed" to entities that are subscribed to the user's presence information, or it can be published or made available on an external server that may be a publicly accessible information resource such as a social networking site, a search engine, or other website.

The information generated by the presence module 290 is updated when the records associated with the user and maintained by the aggregation module 240 and user preferences module 260 are updated. The presence module 290 is typically informed by the other modules of any changes, but the presence module 290 may periodically inquire as to whether any updates have been made.

Since the presence module 260 functions to provide a timely result or conclusion based on data and a set of rules, the presence module 260 may be located anywhere that is convenient to accomplish this function. For example, in addition to being located on a remote server 340 (optionally including a social networking site or search engine, etc) the presence module 260 may be provided as software located on a communication resource in the user-centric mobile network. Of course, in such a case, the user's aggregation and preference records will have to be provided to the location of the presence module 260 to allow it to generate an up to date result.

The resiliency module 270 is responsible for checking for changes in the status of communication resources in the vicinity of the user, as well as for determining whether a communication resource has left the vicinity of the user. The resiliency module accomplishes this by periodically polling the communication resources listed in the aggregation module 240. If a particular communication resource does not respond, then the resiliency module 270 will report to the aggregation module 240 that that communication resource is no longer associated with the user. Similarly, if a particular communication resource indicates that its status has changed, then the resiliency module 270 will report this fact to the aggregation module 240. Alternatively, the communication resource can report updates to the aggregation module 240, either on its own initiative or upon being prompted by the resiliency module.

The transcoding module 280 provides gateway and/or transcoding functions to communication resources that may require them. For example, if a particular communication resource (e.g. such as a headset) does not have its own internet connectivity, the transcoding module 280 may act as an internet gateway for the headset. Similarly, if the headset is using the Bluetooth protocol, the transcoding module may provide transcoding of communication to and from the protocol by means of which the service discovery device 100 has internet access.

The server module 295 serves aggregation, user preference or presence information to a remote entity 345 wishing to communicate with the user, so that the remote entity 345 can communicate with the user in according with the user's existing presence state.

As mentioned above in paragraph 26, the service discovery device 100 may be a standalone device or may be embodied in a number of different form factors. When the service discovery device 100 is embodied in a device that can accomplish other communication functions, such as a laptop or cellular telephone, the resulting multi-function device may itself be a communication resource that is available for communicating with the user of the device. In such a case, the communication resource functionality of the multifunction device will appear in the aggregation record associated with the user (see below) as it would if the communication resource were a separate device, and the communication resource will report it status and availability to the relevant modules of the service discovery device functionality as appropriate. Of course, since the communication resource functionality of the multi-function device is always within range of the service discovery device functionality and the two are physically integrated, certain service discovery device/communication resource functions are no longer necessary (e.g. device discovery, authentication and aspects of resiliency) in the interaction between the communication resource functionality and the service discovery device functionality of the multi-function device.

Figure 3:
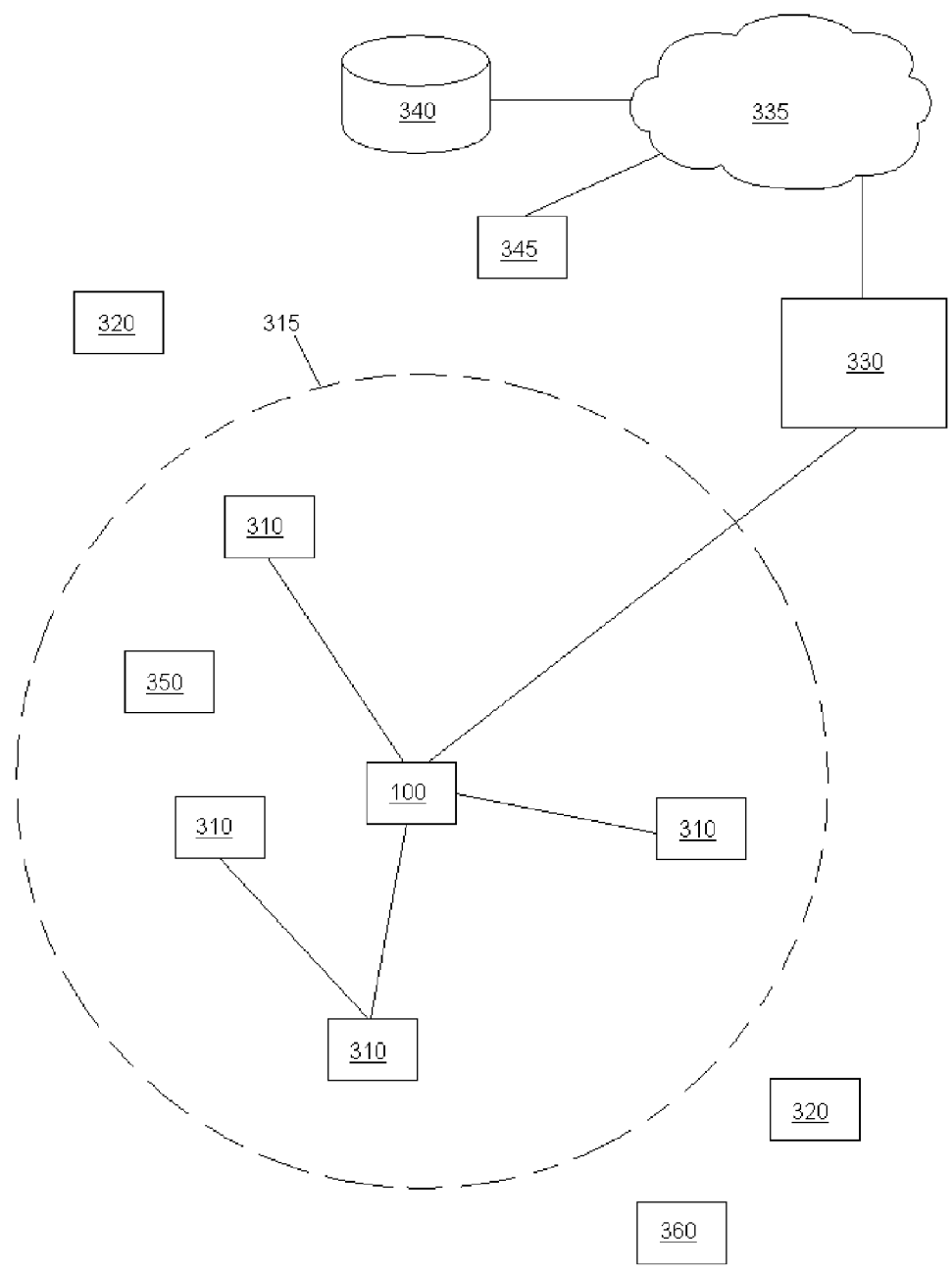
FIG. 3 illustrates an exemplary system in which the portable service discovery device of FIG. 1 functions.

An exemplary system including the service discovery device 100 is shown in FIG. 3. The service discovery device 100 is part of a user-centric mobile network with a number of communication resources 310 that can interact using one or more wireless networking protocols such as Wi-Fi or Bluetooth. The service discovery device 100 includes a connection to the internet 335 via a wireless access point 330. The service discovery device 100 could also include wireless access to other data networks such as the 3G cellular network instead of or in addition to the wireless access point 330.

Associated with the user of the service discovery device 100, or associated with the particular service discovery device itself, are records on a server 340, discussed in more detail below and shown in FIG. 4, that correspond in nature to the records maintained by the aggregation module 240, the preferences module 260 and the presence module 290. The server 340 is accessible by remote entities 345 that wish to communicate with the user of the service discovery device 100 in some manner. Depending on the privacy concerns of the user, the aggregation, preference and presence records may be completely publicly available or maybe accessible only to a limited set of contacts that have been authorized by the user. In some instances, the aggregation module 240, the preferences module 260 and the presence module 290, and the records generated thereby may be found only on an external server 340 and not on the service discovery device 100.

Associated with the service discovery device 100 is a range 315 within which communication resources 310, 320, 350 and 360 can be detected by the service discovery device 100 should they move within range 315. The size of this range can vary, but should preferably be limited to a useful vicinity around the person carrying the service discovery device 100, such that devices that fall within this range are at least potentially useful in some way to the user or to a remote entity 345 wishing to communicate with the user. For purposes of clarity and conciseness, the reference numeral 310 will be used when referring to a generic communication resource 310, 320, 350 or 360, and the particular reference number will be used when referring to a specific one of the communication resources 310, 320, 350 or 360 as will be apparent from the context.

The detection range 315 may coincide with a communications radius of the user-centric mobile network, for example if Bluetooth is being used both for detection and for communications within the user-centric mobile network, but the detection range 315 and the user-centric mobile network communication range may vary. For example, a relatively shorter range protocol may be used for detection with a relatively longer range for communication, such as NFC for detection and Bluetooth for communication, or NFC or Bluetooth for detection and Wi-Fi for communication. This may alleviate the situation where the communication network may have a range greater than a useful vicinity for the user or where there are many devices that might possibly be available for communication. For example, a user may enter a workout room that has a number of internet and Wi-Fi enabled treadmills, in which case NFC may be useful for selecting the particular treadmill that the user intends to use. Similarly, using one protocol for detection and another for communication may alleviate the situation where the detection protocol is not suitable for high speed data transfer.

A communication resource 310 can be any device that is potentially useful for communicating with the user. For example, the communication resource 310. could be a desktop or laptop computer, a printer, a projector or monitor, a television, a video conferencing device, a speakerphone, a headset, a cellular telephone, a whiteboard, devices in cars such as navigation or audiovisual systems, retail kiosks or other information terminals, vending machines, exercise devices, a watch, etc.

While the structure of a communication resource 310 can differ considerably depending on its primary functions, a generic structure of a communication resource 310 may include the components described above with reference to the service discovery device 100 as illustrated with reference to FIG. 1. That is, a communication resource 310 may include one or more transmitter/receivers 110, antenna(s) 112, a microprocessor 120, memory 130, a battery 140, a display 150, user input/output devices 160, media input/outputs 170 (e.g. microphone 172 and speaker 174) and additional miscellaneous hardware 180. The communication resource 310 also typically includes an internal data bus 190 to permit communication between the various components. As with the service discovery device 100, the communication resource 310 may include more or less than the components described with reference to FIG. 1, as necessary or preferred or as is conventional.

Additionally, the communication resource 310 will include functionality (in addition to its primary functionalities) to permit it to participate as needed in the system. For example, referring to the functional modules of the service discovery device 100 illustrated in FIG. 2, the communication resource 310 may for example include an authentication module 230 for exchanging authentication information with the service discovery device 100, and a reporting module 250. In the case of a communication resource 310 however, the reporting module is responsible for reporting its status changes to the service discovery device 100 or the server 340.

Similarly, the communication infrastructure associated with a remote entity 345 can also differ considerably. A generic structure of the communication infrastructure associated with a remote entity 345 may include the components described above with reference to the service discovery device 100 and as illustrated in FIG. 1. That is, the communication infrastructure associated with a remote entity 345 may include one or more transmitter/receivers 110, antenna(s) 112, a microprocessor 120, memory 130, a battery 140, a display 150, user input/output devices 160, media input/outputs 170 (e.g. microphone 172 and speaker 174) and additional miscellaneous hardware 180. The communication infrastructure associated with a remote entity 345 also typically includes an internal data bus 190 to permit communication between the various components. As with the service discovery device 100, the communication infrastructure associated with a remote entity 345 may include more or less than the components described with reference to FIG. 1, as necessary or preferred or as is conventional.

Communication resources 310 may also be located anywhere, for example at a user's home (e.g. the user's home theater system or a refrigerator with an LCD screen), at the user's place of employment, on public transit, at shopping outlets (e.g. information kiosks.) Communication resources 310 can also be devices that are owned and routinely accompany the user, for example, laptop computers, cell phones, portable media players, headsets, game systems etc.

In some instances, communication resources 310 are available to become part of the user-centric mobile network and in some instances they are not. Whether or not a communication resource 310 is available to become part of a user-centric mobile network may depend on security concerns on the part of the particular communication resource 310 or on other considerations. For example, it may not be desirable for a visitor to a corporation to be networked with the corporation's communication infrastructure, but it may nevertheless be useful for those communication resources 310 to be available for use in communication with the user while the user is at that location.

In such a case, the service discovery device 100 may request and receive appropriate information from the communication resource 310, such as a unique resource identifier (e.g. a uniform resource locator, a SIP address, or a telephone number for the device) and available services and status without the communication resource 310 becoming part of the user-centric mobile network. The service discovery 100 can then update the aggregation module 240 (in the server 340 or in the service discovery device 100) that the user is in the vicinity of the communication resource 310, as well its available services and status.

Alternatively, the service discovery device 100 can provide the communication resource 310 with information related to the user, for example the user's SIP address, the service discovery device 100's unique resource identifier, or a telephone number for the user. Accompanying this information identifying the user may be information identifying the server 340. With the information identifying the user and the server 340, the communication resource 310 can then report to the aggregation module 240 in the server 340 that the user is in the vicinity of the communication resource 310, as well as provide information identifying the communication resource 310, its available services and status.

Communication resources 310 owned by the user or with which the user is likely to have an established relationship (e.g. communication resources 310 at a user's place of work) are more likely to be available to be part of the user-centric mobile network, which may provide additional advantages. For example, the service discovery device 100 may serve as a gateway for the communication resource 310 to receive and engage in communications with a remote entity 345 that desires to contact the user of the service discovery device 100.

Whether or not a device forms part of a user-centric mobile network, the presence of the communication resource 310 in the vicinity of the user is reported to the aggregation module 240, 440, which, as mentioned previously and discussed in more detail below, may be located on server 340. Also, as mentioned above, the reporting can be done by the service discovery device 100 or by the communication resource 310. Once the aggregation module 240, 440 has received and updated the record with the information relating to the communication resource 310, the availability of this communication resource 310 for use in communicating with the user is determinable to a remote entity 345 wishing to communicate with the user.

Figure 4:
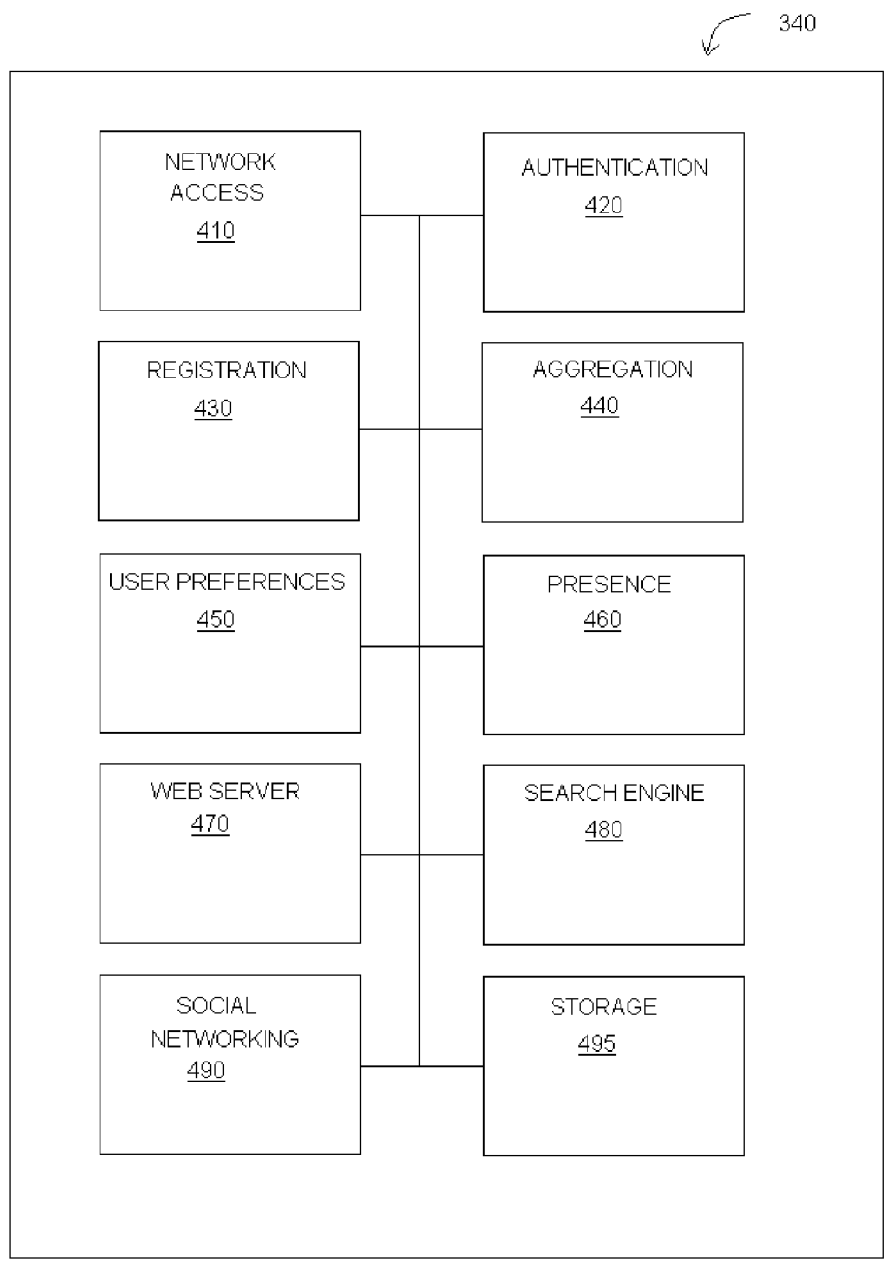
FIG. 4 illustrates an exemplary server with which the portable service discovery device functions.

Referring now to FIG. 4, exemplary server 340 includes a network access module 410 for providing access to and from the internet 335, an authentication module 420, a registration module 430, an aggregation module 440, a user preferences module 450, a presence module 460, a web server 470, a search engine 480, a social networking module 490, and associated data storage 495. Depending on the particular implementation, one or more of these modules may not be required, or may be distributed across a number of servers or server farms.

The authentication module 420 serves to authenticate a service discovery device 100 that is attempting to provide an update to the aggregation module 440 or the user preferences module 450. This is done to prevent unauthorized access to these modules by any person or device other than the particular service discovery device 100 that is attempting to update these records. As discussed above, authentication can take place by means of the exchange of digital certificates using the PKI, or by any other appropriate means, such as by user name and password over an encrypted link.

The authentication module 420 may also serve to limit access by remote entities 345 seeking access to the records maintained by the aggregation module 440, preference module 450 and/presence module 460, depending on the implementation and preferences of the user. For example, some people are comfortable having personal information publicly available, while others are not. In an embodiment where these records are hosted and served by a search engine, anyone searching on a user's name may have access to the records associated with that user. In an embodiment where the records are associated with a social networking site (e.g. LinkedIn, Facebook, Myspace etc.), access to the records may be limited to a user's "friends" or "contacts." Similarly, in a corporate environment, access may be limited to all colleagues working for the same company and contacts that have been invited by the user of the service discovery device 100. The authentication of third parties 345 that wish to view the user's records in the server 340 can take place by means of the exchange of digital certificates using the PKI, or by any other appropriate means, such as by user name and password over an encrypted link.

The registration module 430 registers the association between a particular user and a particular service discovery device 100 when the service discovery device 100 is first purchased by or issued to the user. The registration process typically involves provision of information about the device (e.g. a serial number or manufacturer installed digital certificate) and the user (e.g. the user's SIP address, email address or the user's digital certificate) to permit the creation of unique aggregation, preference and presence records corresponding to the particular user and/or the particular service discovery device 100.

The aggregation module 440 maintains and updates the aggregate record corresponding to a particular service discovery device 100. The aggregation module 440 is updated in response to communication resources 310 entering or leaving the vicinity of the service discovery device 100 and in response to changes in the status and available services of the communication resources 310, 350 that are in the vicinity of the user. This may be accomplished by having a communication resource 310, 350 transmit its available services and current status directly to the server 340 or to the service discovery device 100, which in turn transmits an update to the server 340. In the former case, the communication resource 310, 350 will also transmit information identifying the service discovery device 100 or its user to the external server 340, so that the availability of the communication resource 310, 350 in the vicinity of the user, its available services and status, can be included in the aggregate record associated with the user.

The aggregate record, as mentioned above, is typically an aggregation of the available communication resources 310, 350 that are in the vicinity of the user and are available as resources for interacting with the user, their available services, their status, and identification information relating to the user of the service discovery device 100.

The user preferences module 450 manages a record of the user's communication preferences, which specify the preferred and/or required way in which a remote entity 345 (for example another user, a machine intelligence, or an information service provider) should interact with a user via the communications resources 310 that are available for this purpose. The preferences are user-editable (after authentication) using any suitable device that can access the server, including one or more of the communication resources 310, 350. If the service discovery device 100 is sufficiently full-featured, it may be used itself to edit the user preferences irrespective of where the user preferences are stored.

As discussed above with reference to the presence module 290 of FIG. 2, the presence module 460 in the server 340 applies the rules in the preferences record to the aggregate record to arrive at a snapshot of the user's current "presence" (i.e. availability and willingness to communicate, and the means by which communication should be effected). The presence module 460 will then apply the user preferences to these changed circumstances, and a remote entity 345 wishing to communicate with the user is then informed, for example, that a cell phone call or cellular SMS message are the preferred methods of communicating with the user. Selection between the preferred methods (as appropriate) and initiation of communication using the selected method may be done automatically at the remote entity 345 or may be accomplished by means of user prompts.

The presence module 460 thus generates a conclusion or result from the records maintained by the aggregation module 440 and the preferences module 450. This conclusion or result can then be provided on request to an entity 345 wishing to communicate with the user, or it can be "pushed" to entities that are subscribed to the user's presence information, or it can be published or made available on a publicly accessible information resource such as a social networking site, a search engine, or other website.

In a further refinement, the presence module 460 may also utilize information about the remote entity's presence to generate the conclusion or result as to the preferred method of communicating with the user of the service discovery device 100. For example, if the remote entity is not in possession of a device that is the preferred method of communicating with the user of the service discovery device 100, or the remote entity is in a situation that limits the acceptable means of communication (e.g. if the user is in a meeting where voice communication would not be appropriate), the presence module 460 may recommend an alternative form of communication that is compatible with both parties' presence states.

The information generated by the presence module 460 is updated when the records associated with the user and maintained by the aggregation module 440 and user preferences module 450 are updated. The presence module 460 is typically informed by the other modules of any changes, but the presence module 460 may periodically inquire as to whether any updates have been made.

Associated with the server 340 may be one or more traditional internet/web services, such as a search engine 480 or a social networking site 490. The "presence" of a particular user may be provided online by the search engine 480 in response to a search conducted for the user, or may be provided with a user's record or page on the social networking site. As discussed above, the user's "presence" may be freely available or may be restricted to authorized contacts.

Referring again to FIG. 3, in use a service discovery device 100, carried by a user, forms part of a user-centric mobile network with a number of communication resources 310. Surrounding the service discovery device 100 is a useful vicinity 315 within which communication resources 310 may be used to communicate in some fashion with the user. While the useful vicinity 315 is preferably a practical range for communications (e.g. the confines of an office or room within which the user is located), the useful vicinity is likely to be subscribed by the operational range of relatively short-range communication protocol like Bluetooth.

As mentioned above, various protocols with various ranges may be used to initiate and sustain the useful vicinity 315. For example, a very short range protocol (such as NFC) may be used to detect a new communication resource 310 within the user's proximity, a medium range communication protocol (such as Wi-Fi) may be used for communications within the user-centric mobile network (if the communication resource 310 becomes a member of the user-centric mobile network) and a short range protocol (such as Bluetooth) may be used for resiliency and to determine when a communication resource 310 leaves the useful vicinity 315.

Surrounding the useful vicinity 315 are one or more communication resources 320. As the user moves, a communication resource 320 may come within the detection range of the useful vicinity 315 (e.g. communication resource 350). The service discovery device 100, which is polling at regular intervals to determine whether a communication resource 310 has entered or left the vicinity, detects the presence of communication resource 350 by means of a response from communication resource 350 to the polling.

Service discovery device 100 and communication resource 350 then engage in appropriate handshaking to initiate a communication link between them, and then they authenticate one to the other as discussed above. After authentication, the communication resource 350 may become a part of the user's personal area network or body area network (communication resources 310 and service discovery device 100).

After authentication, the reporting module 250 in the service discovery device 100 initiates reporting of the presence of the communication resource 350 to the aggregation module 240, 440, which may be present on the service discovery device 100 and/or on the server 340. If the aggregation module is in the service discovery device 100, then the communication resource 350 will provide its unique resource identifier and its current status to the service discovery device 100. The communication resource 350 may also provide information regarding its available services or an identification of the type of device. If the communication resource 350 is a known type of device with fixed services (e.g. a landline speakerphone), the available services can be inferred from the device type, but the available services could also be determined by looking up the device's capabilities in a local or remote database of devices. If the communication resource 350 has flexible capabilities or configurations, it is likely that the communication resource 350 will provide its available services/capabilities.

Once the service discovery device 100 has received this information, the aggregation module 240 is updated. If the aggregation module 440 is provided in server 340, the service discovery device 100 transmits the communication resource 350's unique resource identifier, its current status and available service information to the server 340, together with information identifying the user. The information identifying the user is used by the server 340 to identify the record associated with the user that is managed by the aggregation module 440 in the server 340.

The aggregation module 440 in the server 340 then updates the user's record with the presence in the user's vicinity of the communication resource 350, its status and available service information. As discussed above, instead of being provided with available service information, the server 340 can also infer or look up the communication resource 350's available service information. Once the record maintained by the aggregation module 440 has been updated, the presence module 460 can then update the user's "presence" (as discussed above) for provision on request or by subscription to entities 345 wishing to communicate with the user.

As an alternative to the service discovery device 100 reporting this information to the server, the communication resource 350 may report its presence in the vicinity of the user to the server 340. In such a case, the service discovery device 100 provides the communication resource 350 with information identifying the user and identifying the external server 340. The communication resource 350 then reports its unique resource identifier, its current status and available service information (as appropriate) to the server 340, together with information identifying the user. The server 340 then updates the record compiled by the aggregation module 440 as discussed above with respect to reporting by the service discovery device 100.

A remote entity 345 wishing to communicate with the user accesses the user's "presence" information, which has been generated by a presence module 290 or 460 from the aggregation and user preference records that have been generated by the aggregation module 240, 440 and the user preference module 260, 450 to determine the available, preferred and/or required means by which communication with the user is possible. This can be done by the remote entity 345 accessing these records on the server 340 or on the service discovery device 100 via the internet 335 or via some other network. In one embodiment, the application of the requirements and recommendations set forth in the user's aggregation and user preference records can be done by the presence module 290, 460 within the service discovery device 100 or the external server 340, in which case the remote entity 345 access the user's "presence" record in the service discovery device 100 or the server 340. In another embodiment, the remote entity 345 accesses the user's aggregation and user preference records and generates its own conclusion as to how to communicate with the user.

Accessing of the user's "presence" or aggregation and preferences information by the remote entity 345 can be on an ad-hoc basis when communication is desired. This is likely when the user's aggregation and user preference records, or a "presence" record is fully publicly available.

Upon receiving and/or generating a "presence" record based on the user's aggregation and preferences, the remote entity 345 can direct an appropriate communication to the user of the service discovery device 100.

Of course, the presences, statuses and available services of devices 310/350 are not static. To ensure that the record associated with the aggregation module 240 remains current, the resiliency module 270 polls at regular intervals to determine if there are any updates to the communication resources 310, 350 listed in the record associated with the aggregation module 240, 440. If a communication resource 350 moves out of range (i.e. out of the useful vicinity 315 around the service discovery device 100, like communication resource 360), it will not acknowledge the poll by the resiliency module 270. The resiliency module 270 can then report to the aggregation module 240, 440 that the communication resource 360 has left the vicinity of the user, which will remove the communication resource 360 from the user's record. An alternative, and potentially more robust, method of determining whether a communication resource 310 is within or has left the useful vicinity 315 is to monitor the quality of the link (e.g. signal strength, bit error rate, $E_b/N_0$ etc.) between the service discovery device 100 and the communication resource 310.

In the event that the communication resource 350, 310 is still in the vicinity of the service discovery device 100, it will respond to the resiliency module 240's poll with the fact that it is still present, as well as any update to its status or available services. The frequency of polling and response will be a tradeoff between conserving battery life and receiving updates in a sufficiently prompt manner to provide a meaningful picture of the communications options in the vicinity of the user.

As an alternative to polls from the resiliency module 270, the communication resources 310, 350 could periodically report their presence (which could include any status and available service updates).

The communication resources 310, 350 preferably independently report any status and available service update immediately to the resiliency module 270 (for example the initiation of a cellular telephone call) so that the availability or lack of availability of a particular communication channel is reflected in the record maintained by the aggregation module 240, 440 soon after the relevant change in status.

By providing a service discovery device 100 to a user, which can discover and initiate reporting of the presence of communication resources 310 in the vicinity of the user, their statuses and available services (as appropriate), a remote entity 345 can be informed of the available means by which communication with a user is possible. By applying user preferences to this information, a remote entity 345 can be directed to the most appropriate communication channel for communicating with a user.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method comprising:
    discovering communication resources within a desired physical proximity range of a user carried service discovery device, the user carried service discovery device associated with a user identifier corresponding to a particular user, where the user carried service discovery device is operable in a user-centric mobile network, the communication resources including unique resource identifiers;
    associating the unique resource identifiers with the user identifier; and
    transmitting the unique resource identifiers to an entity that is external to the user-centric mobile network to indicate to the entity to communicate with the user using a discovered communication resource within the desired physical proximity range of the user carried service discovery device, wherein the unique resource identifiers permit the entity to communicate with the user via the communication resources without requiring the communication resources to be members of the user-centric mobile network.

2. The method of claim 1 wherein the communication resources have associated therewith an available service and a current status, the method further comprising:
    transmitting available service information and current status information to the entity.

3. The method of claim 2 wherein the resource identifiers, available service information and current status information is aggregated by the user carried service discovery device within the user-centric mobile network.

4. The method of claim 2 wherein an external server polls the communications resources to determine available service information and current status information.

5. The method of claim 2 wherein a discovered communication resource transmits its available service and current status to a server that is accessible from outside the user-centric mobile network.

6. The method of claim 5 wherein the user carried service discovery device within the user-centric mobile network transmits the user identifier and information identifying the server to the discovered communication resource.

7. The method of claim 2 wherein a server that is accessible from outside the user-centric mobile network transmits the available service information and current status information to the entity, the server including preference information relating to how a user prefers to be contacted via the communications resources.

8. The method of claim 7 wherein the preference information is updated based on available service information and current status information.

9. The method of claim 2 wherein a server that is external to the user-centric mobile network transmits the available service information and current status information to the entity, the server being associated with a social networking service.

10. The method of claim 9 wherein access to information associated with the user identifier is limited to individuals who have been authorized by the user.

11. The method of claim 1 wherein a server that is external to the user-centric mobile network transmits the available service information and current status information to the entity.

12. The method of claim 1 wherein a server that is a member of the user-centric mobile network transmits the available service information and current status information to the entity.

13. A portable communications service discovery device for determining communication resource availability within range of a user-centric mobile network, comprising:
    a resource discovery module for discovering communication resources within a desired physical proximity range of the portable communications service discovery device, the portable communications service discovery device to be carried by a user of the user-centric mobile network, the communication resources having unique resource identifiers, the unique resource identifiers permitting an entity that is external to the user-centric mobile network to communicate with the user via the communication resources without requiring the communication resources to be members of the user-centric mobile network; and
    a reporting module for providing the unique resource identifiers and a user identifier to a server that is accessible from outside the user-centric mobile network, thereby to permit the entity that is external to the user-centric mobile network to communicate with the user via a discovered communication resource within the desired physical proximity range of the portable communications service discovery device without the discovered communication resource becoming a member of the user-centric mobile network.

14. The device of claim 13 wherein the communication resources have associated therewith an available service and a current status and wherein the reporting module provides available service information and current status information to the server.

15. The device of claim 14 wherein the device aggregates resource identifiers, available service information and current status information.

16. The device of claim 14 wherein a discovered communication resource transmits its available service and current status to the server.

17. The device of claim 16 wherein the provision of a discovered communication resource's available service information and current status is initiated by the reporting module transmitting the user identifier and information identifying the server to the discovered communication resource.

18. The device of claim 14 wherein the provision of a discovered communication resource's available service information and current status is initiated by the reporting module transmitting the user identifier and the unique identifier of the discovered communication resource to the server, which in turn polls the discovered communication resource for its available service information and current status.

19. The device of claim 14 wherein the server is located in the service discovery device.

20. A method comprising:
    discovering a communication resource within a desired local proximity to a service discovery device carried by a user that is operable in a user-centric mobile network, the communication resource including a unique resource identifier; and transmitting the unique resource identifier of the communication resource from the service discovery device to a remote entity, the unique resource identifier operable to indicate an availability of the user of the service discovery device to receive a communication at the communication resource, wherein the unique resource identifier permits the remote entity to communicate with the user via the communication resource without requiring the communication resource to be a member of the user-centric network.

21. The method of claim 20 wherein the service discovery device carried by the user is a laptop computer, smartphone, or headset.

22. The method of claim 20, wherein the desired local proximity corresponds to a wireless communications range of a Bluetooth communications protocol or a wireless communications range of a Near Field Communications protocol.

23. The method of claim 20, further comprising transmitting a user identifier corresponding to the user to the remote entity, the user identifier associated with the service discovery device.

24. The method of claim 23, wherein the user identifier and the unique resource identifier are operable to indicate to the remote entity to transmit communications intended for the user of the service discovery device to the communication resource.

25. The method of claim 20, further comprising: receiving at the communication resource the communication from the remote entity to output at a communication resource user interface, the communication intended for the user of the service discovery device.

* * * * *